(No Model.) 2 Sheets—Sheet 1.

T. M. FOOTE.
MAGNETIC COUPLING DEVICE.

No. 433,400. Patented July 29, 1890.

WITNESSES
Frank H. Parker
Matthew M. Blunt

INVENTOR
Theodore M. Foote
by his attorney
Alex. L. Hayes.

(No Model.)  2 Sheets—Sheet 2.

T. M. FOOTE.
MAGNETIC COUPLING DEVICE.

No. 433,400. Patented July 29, 1890.

WITNESSES.
Matthew M. Blunt
Frank G. Parker

INVENTOR
Theodore M. Foote
by his attorney
Alex L. Hayes

UNITED STATES PATENT OFFICE.

THEODORE M. FOOTE, OF BOSTON, MASSACHUSETTS.

MAGNETIC COUPLING DEVICE.

SPECIFICATION forming part of Letters Patent No. 433,400, dated July 29, 1890.

Application filed July 18, 1889. Serial No. 317,879. (No model.)

*To all whom it may concern:*

Be it known that I, THEODORE M. FOOTE, of Boston, in the county of Suffolk and State of Massachusetts, have invented a new and useful Improvement in Electric Motors, of which the following, taken in connection with the accompanying drawings, is a specification.

The object of this invention is to provide an electric motor in which the mechanism driven thereby can be connected to or disconnected from the shaft of the rotary armature without stopping the rotation of the latter, whereby the momentum of the armature is utilized in starting the driven mechanism.

Figure 1:
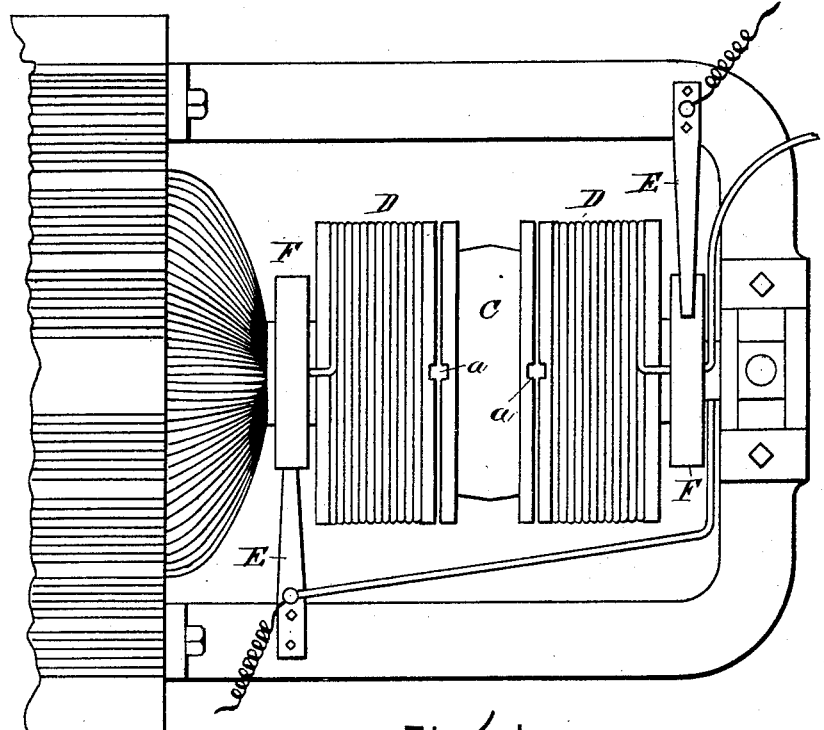
Figure 2:
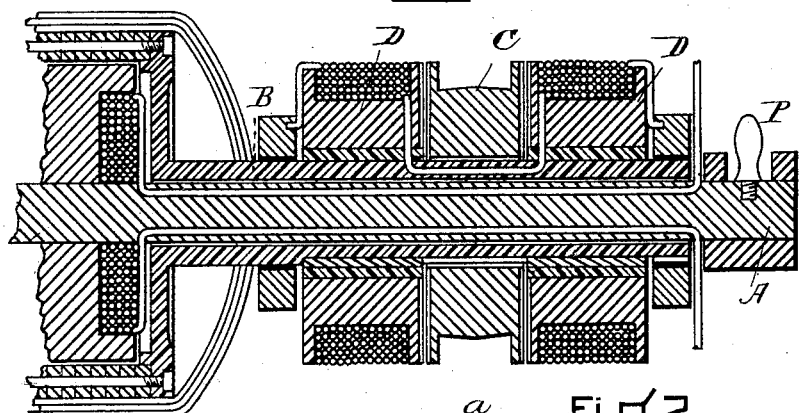
Figure 3:
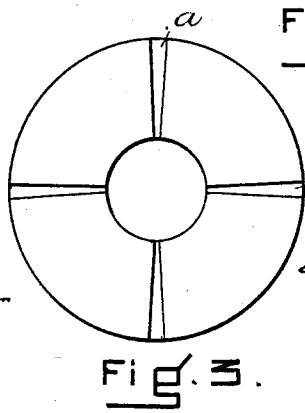
Figure 4:
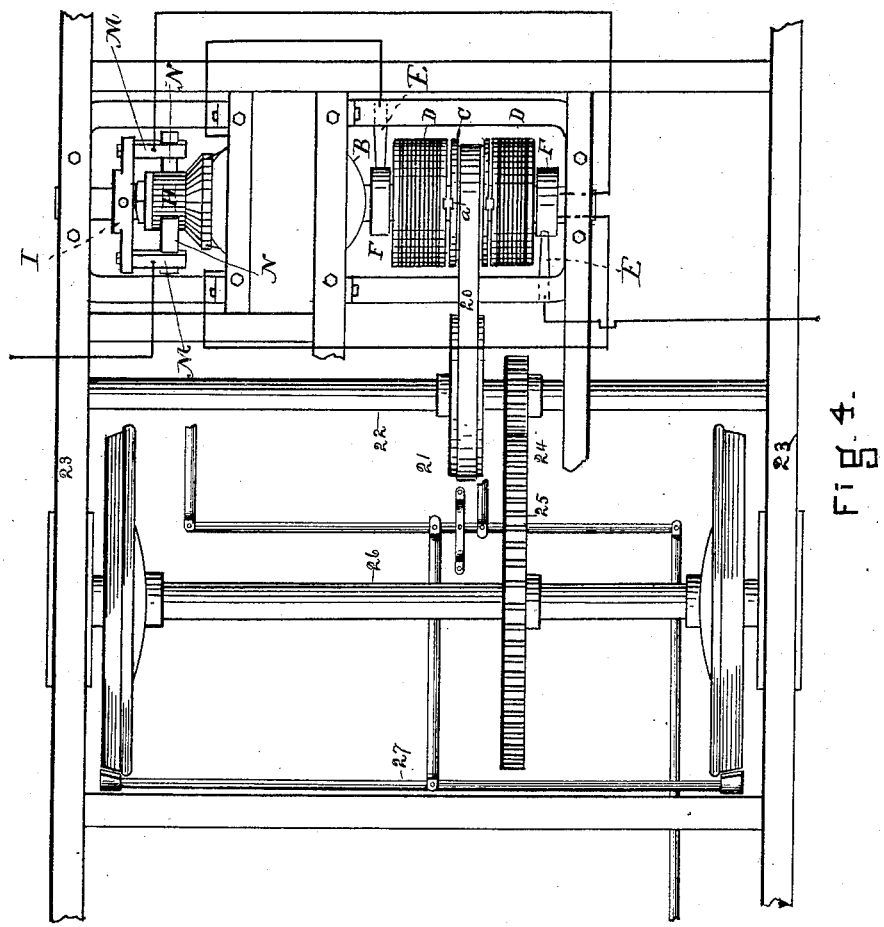

In the accompanying drawings, Figure 1 is a plan view of one form of my invention. Fig. 2 is a sectional view of the same. Fig. 3 is a view of the face of one of the collars. Fig. 4 represents a street-car provided with this improved motor.

In the several figures the same letters refer to the same parts.

I have represented my invention as applied to a form of electric motor invented by me, which I have described and claimed in another application for Letters Patent of the United States filed by me with this, Serial No. 317,880, in which motor the rotating armature is mounted upon a sleeve upon a non-rotating shaft; but the device can be used with any other form of motor.

Referring to the drawings, A is the non-rotating shaft of the motor.

B is the rotating sleeve, to which the rotating armature of the motor is fixed.

C is a collar of magnetic metal, preferably of iron, loose upon the sleeve, and made in the form of a pulley for the reception of a belt connecting it to the work; but it may be in the form of a gear-wheel, if this is preferable.

D D are two collars, of magnetic metal, preferably iron, fixed on the sleeve B on each side of the collar C and rotating with the sleeve B. Upon each of these collars is wound a wire, forming part of an electric circuit, so that the collar becomes an electro-magnet. Each of these collars will have a longitudinal movement upon the sleeve, and when the electro-magnets become operative each will move against the opposite face of the collar C and adhere to the same, and will slide upon the same with a frictional contact until the faces adhere together and the collars move together, as in other forms of frictional clutches, thereby preventing injury by sudden connection or disconnection. Upon each of the opposing faces are cut a series of radial grooves *a a*, the effect of which is to form angles which increase the magnetic attraction. These grooves need not be opposite to one another, as a sliding contact to a certain extent is desirable; but when the angles come opposite to one another the magnetic attraction will be increased at these points to such an extent as to tend to cause the firm adhesion of the collars.

Instead of the two fixed collars—one on each side of the loose collar—there may be only one fixed collar, in which case either the loose collar or the fixed collar may have a sliding movement upon its shaft. The loose collar may be extended on one or both sides of the pulley or gear wheel on the same, and on this extension or these extensions may be wound a coil of wire forming part of an electric circuit. In this case the loose collar is the electro-magnet, and the fixed collars or collar the armatures or armature for the same.

Instead of a collar wound with a wire, the collar may be in the form of a disk, and electro-magnets parallel to the sleeve and concentric with it may be attached to this disk.

The current may be carried to coils on the clutch by means of brushes E E, which bear upon collars of non-magnetic metals F F, fixed on the sleeve or each side of the clutch. The coils on the clutch may be in an independent circuit, or the circuit through them may form part of the circuit through the motor. There may be a series of these clutches upon a single shaft, and the loose collars may each be connected to a different work—as, for example, one of a series of sewing-machines. Any one of the machines can thus be connected or disconnected at will from the driving-shaft.

This apparatus will be found useful in the operation of street-cars by electricity, and its use will result in a saving in the power required to operate the car.

In the system in use at present the electric motor is stopped every time that the car stops, and it requires the expenditure of much more power to again start the car than it does to maintain the car in motion. If the motor is always maintained in rotation, the expenditure of power required to overcome the inertia of the heavy motor when at rest is saved.

The invention is illustrated in Fig. 4 in connection with a street-car, in which the loose collar C is connected by a band 20 with a pulley 21 on a counter-shaft 22, supported in the frame 23 of the car-body. The counter-shaft 22 is provided with a pinion 24, which meshes with a gear 25, fixed on the car-axle 26. Any suitable brake mechanism, as 27, is employed for braking the wheels.

When it is desired to stop a car provided with this improved electric motor, the circuit of the electro magnet or magnets of the clutch is broken, whereby the running-gear of the car is disconnected from the motor, and the ordinary brake mechanism is then applied to stop the running-gear. The car is started by closing the circuit through the electro magnet or magnets, whereby the running-gear is gradually reconnected with the motor by the action of the friction-disks. The motor-armature continues to rotate while the running-gear is disconnected, and its momentum is utilized in starting the car, so that there is no necessity of increasing the power to overcome inertia.

When the clutch-magnets are placed in the same circuit with the motor-magnets and breaking the circuit in the clutch-magnets breaks the circuit in the motor, the armature of the motor, owing to the inertia of the moving mass, will not immediately stop rotating when the circuit is broken.

As the stops of street-cars are generally of short duration, the speed of the moving part of the motor will generally be but slightly diminished before the current is re-established.

Having thus described my invention, what I claim, and desire to secure by Letters Patent of the United States, is—

1. The combination of a dynamo-electric motor, mechanism driven thereby, and an electro-magnetic friction-clutch disposed in the motor-circuit, one member of said clutch being connected with the armature-shaft of said motor and the other member thereof with said mechanism.

2. The combination of a dynamo-electric motor, mechanism driven thereby, and an electro-magnetic friction-clutch interposed between said motor and the driven mechanism, the meeting faces of the clutch members being provided with radial grooves entirely below the plane of contact and forming angles on said faces which increase the magnetic attraction.

3. The combination of a car-body, a dynamo-electric motor thereon, running-gear supporting said car-body, an electro-magnetic clutch interposed between said motor and said running-gear for connecting the latter with the former, and a brake for stopping the car when the motor and running-gear are disconnected.

In testimony whereof I have signed my name to this specification, in the presence of two subscribing witnesses, on this 12th day of July, A. D. 1889.

THEODORE M. FOOTE.

Witnesses:
FRANK G. PARKER,
MATTHEW M. BLUNT.